United States Patent [19]

Genovese

[11] Patent Number: 4,952,022
[45] Date of Patent: Aug. 28, 1990

[54] FIBER OPTIC LINE ILLUMINATOR WITH DEFORMED END FIBERS AND METHOD OF MAKING SAME

[75] Inventor: Frank C. Genovese, Fairport, N.Y.

[73] Assignee: Xerox Corporation, Stamford, Conn.

[21] Appl. No.: 318,083

[22] Filed: Mar. 2, 1989

[51] Int. Cl.⁵ .................. G02B 6/04; G03B 27/00; F21V 7/04; B54H 81/00

[52] U.S. Cl. .................. 350/96.24; 350/96.25; 350/320; 355/1; 362/32; 156/169; 156/173; 65/4.2

[58] Field of Search .............. 350/96.24, 96.25, 96.26, 350/96.27, 320; 355/1; 362/32; 156/60, 155, 158, 160, 169, 173; 65/4.1, 4.2, 4.3

[56] References Cited

U.S. PATENT DOCUMENTS

| | | | |
|---|---|---|---|
| 2,825,260 | 3/1958 | O'Brien | 350/96.25 |
| 3,188,188 | 6/1965 | Norton | 350/96.24 |
| 3,216,807 | 11/1965 | Woodcock | 350/96.24 |
| 3,472,718 | 10/1969 | Siegmund | 350/96.29 |
| 3,556,635 | 1/1971 | Schrenk et al. | 350/96.24 |
| 3,982,829 | 9/1976 | Hirth | 355/1 |
| 4,026,693 | 5/1977 | Sato | 350/96.25 |
| 4,190,347 | 2/1980 | Siegmund | 355/1 |
| 4,530,565 | 7/1985 | Markle | 350/96.10 |
| 4,564,866 | 1/1986 | Comberg | 355/1 X |
| 4,597,030 | 6/1986 | Brody et al. | 362/32 |
| 4,677,531 | 6/1987 | Szeles | 362/32 |
| 4,718,752 | 1/1988 | Sprague et al. | 350/385 |
| 4,719,488 | 1/1988 | Setani et al. | 355/1 |
| 4,730,895 | 3/1988 | Siedband et al. | 350/96.24 |
| 4,763,142 | 8/1988 | Saitoh et al. | 346/160 |
| 4,768,857 | 9/1988 | Sakunaga et al. | 350/96.24 |
| 4,824,194 | 4/1989 | Karasawa | 350/96.24 X |
| 4,871,228 | 10/1989 | Roos | 350/96.25 |

FOREIGN PATENT DOCUMENTS 62-186283  8/1987  Japan .................. 355/1 X Primary Examiner—Brian Healy

[57] ABSTRACT

A fiber optic illuminating device is formed by assembling a plurality of large diameter fibers into a bundled array. An entrance face of the array is arranged in a circular configuration proximate a light source, and the output face is deformed by heating and compressing the circular fiber ends into a rectangular configuration. The light output exits the array in a linear beam having improved uniformity.

7 Claims, 3 Drawing Sheets

FIBER OPTIC LINE ILLUMINATOR WITH DEFORMED END FIBERS AND METHOD OF MAKING SAME

BACKGROUND AND PRIOR ART STATEMENT

Document reproduction machines are known in the art which utilize fiber optic linear illuminators to provide a line illumination at a document platen. For xerographic copiers, it is desirable to provide a uniform band of illumination along a scan strip on the document platen. The illumination source or, alternatively, the document, are moved, and a flowing image is projected onto a photoreceptor surface forming a latent image thereon. The uniformly illuminated line can be provided by means of a plurality of optical fibers which have a circular input face but a fan-like output face. A typical formulation is shown in FIG. 1 of U.S. Pat. No. 4,190,347. There, a light source 26 is directed into the input face of a fiber optic bundle 24. The light-emitting ends of the circular fibers are tightly grouped together at a receiving face 30 and the light-emitting ends juxtaposed along a line 32 to form a linear slit 34. The light-emitting face can comprise one or a plurality of layers. A problem with this configuration is that two or more rows of fibers are typically required to provide the required uniformity of the band of illumination exiting the output face. This requirement increases the expense of the illuminator. Because of the large number of fibers and their closely-packed density, the device is prone to unavoidable fiber breakage or splitting in the light emitting end, both factors resulting in non-uniform illumination at the illuminated plane. The solution to this problem in U.S. Pat. No. 4,190,347 was to introduce a cylindrical lens 36 between the light-emitting end face and the document 14.

Other prior art which utilize fiber optic bundles having linear end faces are disclosed in U.S. Pat. Nos. 3,982,829 and 4,597,030. In the former patent a plurality of fiber optics are bundled together to form a circular light receiving input end and a linear light emitting end positioned adjacent a document platen. U.S. Pat. No. 4,597,030 discloses a surgical illuminator which is linear at both end faces.

It is known in the art to utilize linear electronic print bars to generate images at a photoreceptor during the exposure mode. One example is shown in U.S. Pat. No. 4,763,142. Here a linear light source is required to provide a uniform band of illumination into the entrance face of the linear bar. The bar may, for example, comprise a plurality of liquid crystal cells whose transparency is controlled by a voltage input corresponding to image signals from a remote source. Light from the illuminator source is transmitted through the image bar as a modulated output, the modulation depending upon the instant state of the liquid crystal cells. Another example is disclosed in U.S. Pat. No. 4,718,752. Here an electrooptic image bar 12 is illuminated by an illuminator 24 and modulated to produce the desired modulated output at a photosensitive image plane. One problem with these types of prior art systems is that the light source must be linear to match the geometry of the light-bar orifices and must provide high intensity uniform illumination in order that reasonable operating speeds and good print quality can be achieved. Fluorescent tubes have been used for this purpose but output uniformity depends on the distribution of condensed mercury vapor on the bulb, and the phosphors tend to overheat at the higher operating powers, appreciably degrading light output. Linear tungsten filament bulbs have also been used but lamps with long unsupported filaments are prone to vibration and sagging. On the other hand, bulbs with supported or segmented filaments tend to be non-uniform in light output, and heavy self-supporting filaments require very high power input. Laser beam inputs, such as used in the 4,718,752 patent, are relatively costly.

According to the present invention, an optical fiber illuminator is described which provides a uniform line of illumination at either a document platen, for illumination purposes, or at the input face of an image bar. The optical fiber illuminator is formed in a first embodiment using a plurality of relatively course optical fibers. The fibers are configured so as to form a generally circular, light-receiving input face. The end face is formed into a linear shape in which each fiber end is changed, in one embodiment, by a heat and pressure process, from a circular to a generally rectangular configuration. Reforming the fiber ends eliminates the need to use multiple layers of very fine fibers, as required by the prior art devices, to have the finished line source appear continuous. Output intensity is also enhanced because the dead space between close packed round fibers, which is about 10%, is virtually eliminated. In a second embodiment, the overall light collection efficiency for a given lamp geometry is enhanced by reforming the input end of the fiber bundle as well. Using relative few large fibers rather than many small ones makes fabrication much easier and cheaper because the larger fibers are easier to handle and winding a single layer of the courser, larger fibers, is much faster.

More particularly, the present invention is directed towards a linear illuminator comprising a light source and a plurality of optical fibers formed into a light conducting array; the fibers having a light receiving end placed adjacent said light source and a light-transmitting end placed adjacent a linear plane to be uniformly illuminated, the light receiving end of said fibers being circular and being grouped together to form a generally circular array said light-transmitting ends of said fibers being generally rectangular and formed into a linear array.

IN THE DRAWINGS

DESCRIPTION OF THE INVENTION

Figure 1:
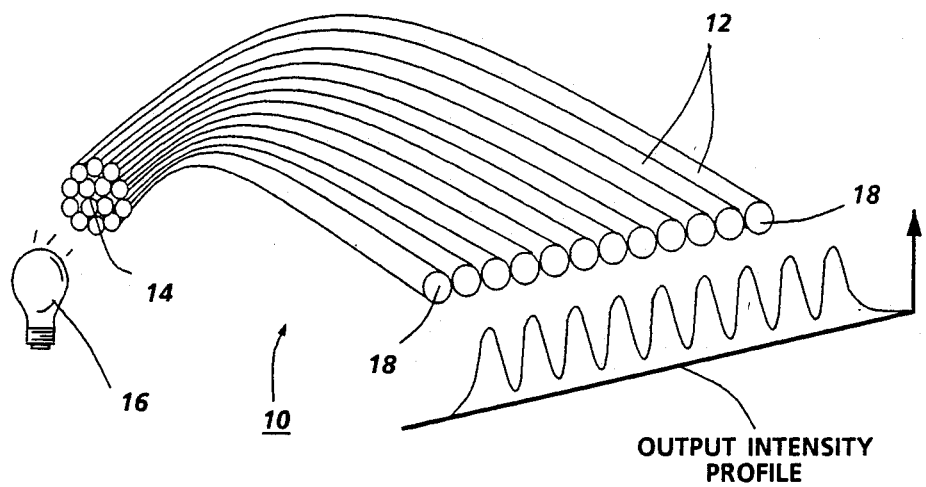
FIG. 1 shows an optical intensity profile at a linear plane for a prior art optical fiber illuminator having a single layer of fibers arranged in a linear end face.
Figure 2:
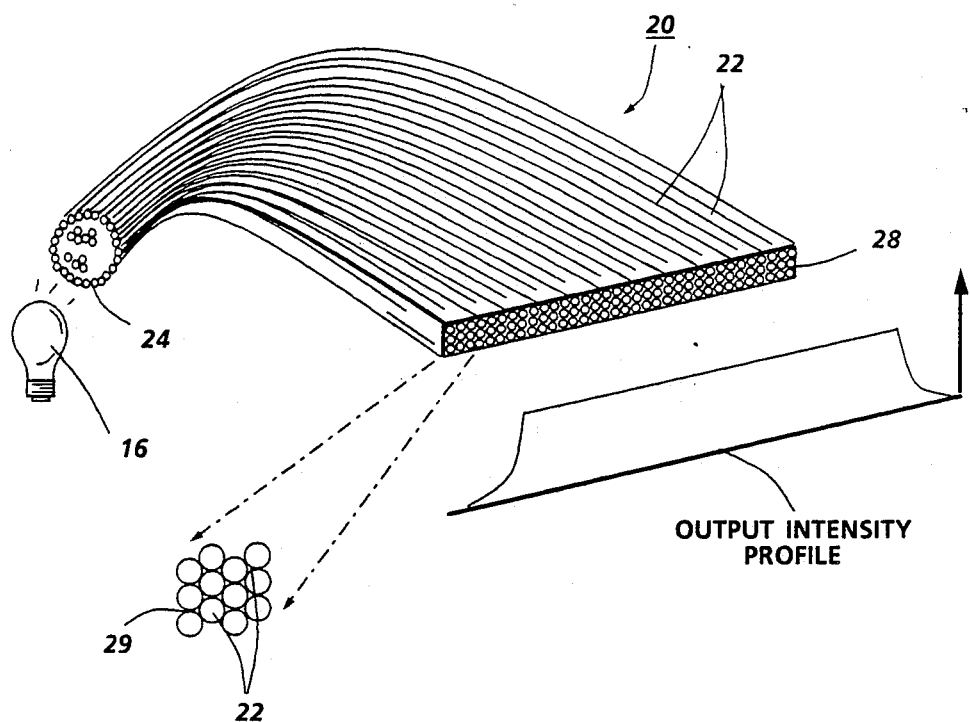
FIG. 2 shows an optical intensity profile, at a linear plane for a prior art optical fiber illuminator having a multiple layer of fibers arranged in a linear end face.

Referring to FIG. 1, a prior art fiber optic illuminator 10 is shown. A plurality of circular optical fibers 12 are formed so as to present a circular input face 14 to a light source 16. The end face 18 is formed by a arranging the fibers linearly. The output intensity profile of the transmitted light at a linear plane is non-uniform and hence not suitable for copying or imaging type applications. For commerical products the illuminator of FIG. 2 is preferred. As shown, fiber optic illuminator 20 comprises a plurality of fibers 22 much greater in number than those used in the FIG. 1 embodiment. The input end face 24 is again formed by bringing together the fiber ends into a circular configuration. The end face 28 is formed by arranging multiple layers of the fibers into a linear row. The profile of the light entering face 24 via lamp 16 is transmitted through end face 28 resulting in a linear uniform band of light shown in the plot.

The uniform output profile, as explained above, is achieved by a tradeoff of increasing the number of optical fibers from the FIG. 1 embodiment. This design is further subject to decrease efficiency because of the dead spaces 29 between each fiber. Also, the fiber is subject to the splitting problem described above which reduces the uniformity.

Figure 3:
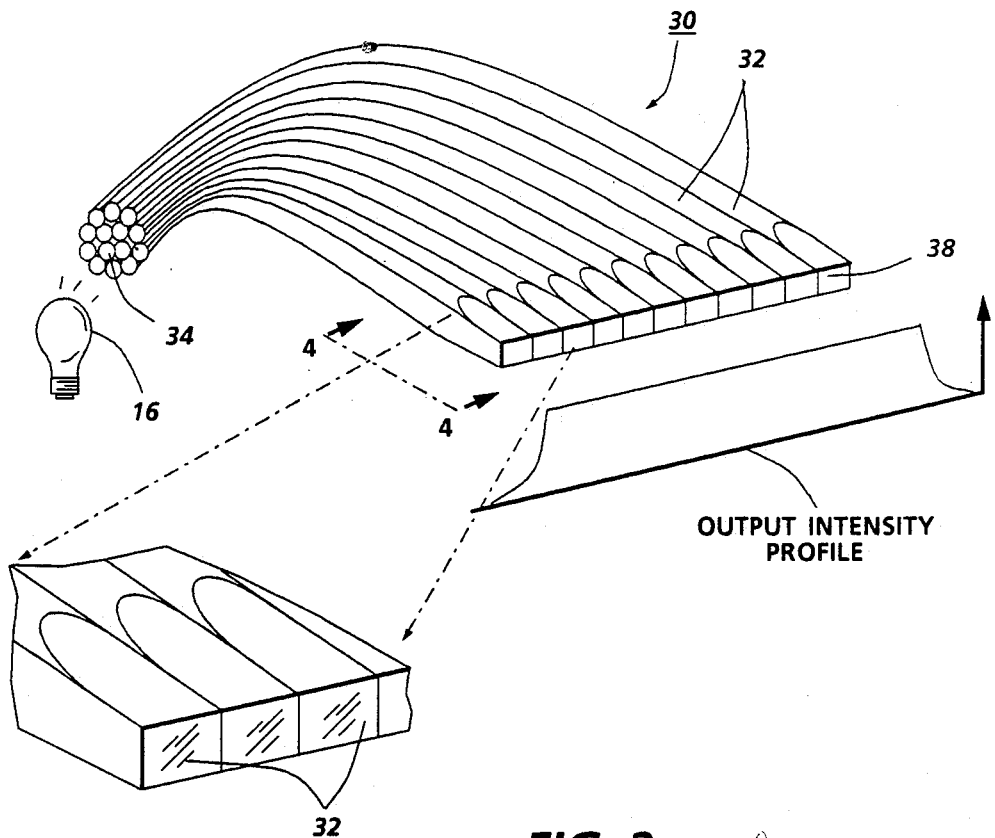
FIG. 3 shows an optical fiber illuminator of the present invention having a single array of fibers arranged with a linear end face, the optical fibers being compressed at the end face to assume a rectangular configuration.
Figure 4:
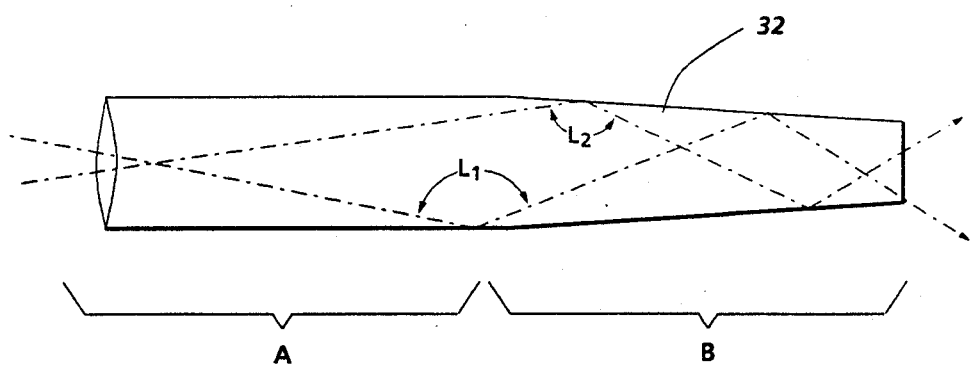
FIG. 4 shows a side profile view of one of the fibers showing more clearly the compressed end face of a fiber.

Turning now to FIG. 3, a novel optical fiber illuminator 30, according to the present invention, is shown. A plurality of relatively coarse (defined below) optical fibers 32 are formed so as to present a circular end face 34 to the light source 16. (The number of fibers shown are illustrative only). The opposite end face 38 is formed by compressing the fiber under heat and pressure to form uninterrupted emmiting areas with a rectangular, rather than circular configuration. As shown in FIG. 3, the light emitted at output face 38 also creates a uniform output intensity profile at a linear plane but does so with fewer fibers than the FIG. 2 embodiment. Also, as compared to the FIG. 2 embodiment, the dead spaces are practically eliminated. The fiber breakage problem is also greatly reduced. As shown in FIG. 4, each fiber changes from a circular cross-section in area A to a gradually tapered cross-section in area B. Light paths $L_1$, $L_2$ are shown with the light reflected from the sides at the incident angle. The surface of the tapered area can be aluminized to prevent light from escaping.

A preferred method of making illuminator 30 is a follows. A number of plastic fibers 32, 1 mm in diameter are arranged in a single layer and close wound on a cylindrical drum. (If the drum is large enough, illuminator 30 can be made in pairs.) While still on the drum, the fibers are compressed between heated polished surfaces until achieving the configuration shown in the enlarged view in FIG. 3 and allowed to cool in place. Compression is adjusted so that plastic fiber is sufficient to fill the dead space between fibers as they soften. Temperature is adjusted so that adjacent fibers bond to each other forming an unbroken sheet, and maintain this shape when pressure is removed. Mounting plates may then be bonded to the fiber assembly to fasten the illuminator in place. After removal from the winding drum, the assembly is machined along the fused portion of the fiber and the exposed fiber ends are polished.

For a single layer of fibers, a preferred compression ratio is $\pi/4 = 0.78$. Compressing a circular bundle at the input-end, the ratio of diameters before and after is approximately $\pi/2\sqrt{3} = 0.91$. It is also possible to overcompress the fibers. Rather than close-wind the fibers on the drum, they are wound with an predetermined space between them. The circumference of the drum outside the fusing area is threaded at the desired pitch so as to hold the fibers at evenly spaced intervals. The fibers are then compressed to fill in the interstitial spaces and the final compressed dimension will depend on the thread pitch. Flattening the fiber ends in this way modifies the divergence of the emitted light. In the elongated direction of the fiber, the divergence tends to be reduced, in the compressed direction it is increased. The light escaping the fiber at the compressed surface can be reduced by aluminizing the compressed fiber surfaces over the cladding.

Coarse fibers proven to be effective for the purposes of the invention will have an original diameter between 0.5 and 2.5 mm.

From the above, it is seen that an improved illuminator is presented which is suitable for uniformly illuminating scan lines on a object plane, such as a document platen. The illuminator is also useful for providing a uniform band of illumination across a linear optical imaging bar of the types discussed in the Background section. While a preferred shape for the output fiber ends is rectangular, a generally square configuration may prove suitable for some systems. A square shape is achieved by reducing the pressure applied to the heated fiber ends. While the invention has been described with reference to the structure disclosed, it is not confined to the specific details set forth, but is intended to cover such modifications or changes as may some within the scope of the following claims:

What is claimed is:

1. A linear illuminator comprising
    a light source and
    a plurality of optical fibers formed into a light conducting array; the fibers having a light-receiving end placed adjacent said light source and a light-transmitting end placed adjacent a linear plane to be uniformly illuminated, the light receiving ends of each of said individual fibers being circular and being grouped together to form a generally circular array, said light transmitting ends of each of said individual fibers being generally rectangular and aligned along a single non-staggered row to form a linear array.

2. The linear illuminator of claim 1 wherein said linear plane is a linear optical imaging bar.

3. The linear illumination of claim 1 wherein said light transmitting ends of said fibers are generally square.

4. A method of forming an optical fiber light transmitting array having an output face arranged in a linear configuration including the steps of
    bonding a plurality of circular optical fibers formed in at least a single layer in close proximity to each other to form an integral array having a first and second face,
    compressing at least one of said faces in a heated environment to deform the circular ends of each fiber into a generally rectangular configuration along a single, non-staggered linear row and
    cooling the array to preserve the heated and compressed end in a permanent deformed state.

5. The method of claim 4 wherein each optical fiber has a diameter, before compression, between 0.1 and 2.5 mm.

6. The method of claim 4 wherein the fibers are closely wound on a cylindrical drum before the heating and compressing steps.

7. The method of claim 6 wherein the fibers are wound on said drum with spaces therebetween.

* * * * *